United States Patent [19]

Pearsall

[11] 4,086,117
[45] Apr. 25, 1978

[54] TAPING MACHINE

[75] Inventor: Harold I. Pearsall, Centerville, Ohio

[73] Assignee: The Globe Tool and Engineering Company, Dayton, Ohio

[21] Appl. No.: 781,873

[22] Filed: Mar. 28, 1977

Related U.S. Application Data

[63] Continuation of Ser. No. 638,435, Dec. 8, 1975, abandoned.

[51] Int. Cl.$^2$ .............................................. B31F 1/00
[52] U.S. Cl. .................................. 156/212; 53/198 R; 100/2; 100/10; 100/12; 156/468; 156/482; 156/486; 156/518; 156/576
[58] Field of Search ............... 156/475, 443, 468, 522, 156/486–493, 204, 482, 576, 577, 212–215, 217, 28; 100/2, 10, 12, 6, 8, 17, 34; 53/198

[56] References Cited

U.S. PATENT DOCUMENTS

| | | | |
|---|---|---|---|
| 1,151,504 | 8/1915 | Woodland | 156/475 |
| 2,569,513 | 10/1951 | Burge et al. | 156/482 |
| 2,742,851 | 11/1956 | Fryer | 100/10 X |
| 2,972,294 | 2/1961 | Lecocq | 100/12 X |
| 3,033,102 | 5/1962 | Fryklund | 100/2 UX |
| 3,063,212 | 11/1962 | Possis et al. | 53/198 |
| 3,108,922 | 10/1963 | Possis et al. | 156/468 |
| 3,394,039 | 7/1968 | Johnson | 156/468 |
| 3,970,259 | 7/1976 | Schmid | 242/7.08 |

Primary Examiner—David A. Simmons
Attorney, Agent, or Firm—Dybvig & Dybvig

[57] ABSTRACT

Apparatus for wrapping tape around the end of a stator coil. The apparatus advances tape from a spool to a position near the coil end, where it is clamped by clamping members and cut, and a section of the tape adjacent the leading end is pressed against one side of the coil end. The trailing end of the tape is then pushed around the opposite side of the coil end where it is received by the clamping members. The trailing end is moved by the clamping members toward the leading end to draw the trailing end tightly around the coil and press it to the leading end.

20 Claims, 17 Drawing Figures

TAPING MACHINE

This is a continuation of application Ser. No. 638,435, filed Dec. 8, 1975, now abandoned.

BACKGROUND OF THE INVENTION

This invention relates to apparatus for wrapping tape around an article and in particular to apparatus for wrapping tape around the ends of stator coils.

Apparatus for wrapping coils or wires with tape typically involve many moving parts such as rollers, smoothing arms, and the like. Because of the number of parts, such apparatus are relatively expensive and complex. In addition, because such parts normally require considerable space in which to perform the taping operation, it is difficult to perform several taping operations simultaneously within a small area, as may be needed, for example, to tape the coil ends of a multi-coil stator.

SUMMARY OF THE INVENTION

An apparatus embodying the present invention wraps tape around an article in several simple mechanical steps, has a minimum number of moving parts, and requires little working area during its operation. The apparatus is particularly useful in wrapping tape about the ends of coils mounted on stator cores where there is little available space for performing the wrapping operation.

In accordance with the present invention, an apparatus for wrapping tape about an article is provided with two clamping members. The clamping members cooperate to receive a leading end of the tape from one side of the article and a trailing end of the tape from the opposite side of the article. The clamping members then draw the trailing end tightly about the article and press it to the leading end.

In the illustrated apparatus, there is also included tape feed means, a tape press member, and tape engaging means. A strip of tape is fed by the tape feed means so that the leading end is moved in a direction along a first side of the article to a position where it is clamped by the clamping members. The tape press means then presses a section of the tape adjacent the leading end to the first side of the article and also acts to bend the trailing end partially around the article. The tape engaging means further bends the trailing end around the article and in a direction along the side opposite the first side to a position where it also is received between the clamping members. The clamping members are returned toward their initial position which causes the trailing end, as previously mentioned, to be drawn tightly around the article and pressed to the leading end, thereby completing the taping operation. The apparatus and its operation can be modified to either press the leading and trailing ends together to form a tab projecting from the article or to press the ends together and to the article, the trailing end over the leading end, so that no tab is formed.

In the embodiments described, the apparatus is used to tape the end of a coil mounted on a stator. The first of the movable clamping members is the margin bounding an aperture in a tool member. The tool member is quite narrow and thin and thus movable between the coil end and the end face of the stator. The second clamping member is an extension of the tape press member. The extension is contained within the aperture of the tool member and the tape press member is slidably mounted on the tool member. The movement of the tape press member is toward and away from the radially outward side of the coil end. The tape press member has a contoured surface which presses the adjacent section of tape to a radially outward side of the coil. A tape ram acts as the tape engaging means, moving along the longitudinal axis of the stator to bend the trailing end about the coil end.

Since the work space needed for the moving parts can be quite small, an apparatus in accordance with the present invention is particularly adaptable for cooperating with several identical apparatus to perform simultaneous taping operations on several coil ends on a single stator core. Because of the minimum number of moving parts and the small working area required, there is no interference by the parts of one apparatus with another. In fact, plural simultaneously operating apparatus could be designed to use a common tape engaging means to further simplify the construction of the apparatus.

DESCRIPTION OF THE PREFERRED EMBODIMENTS

Figures 1, 2:
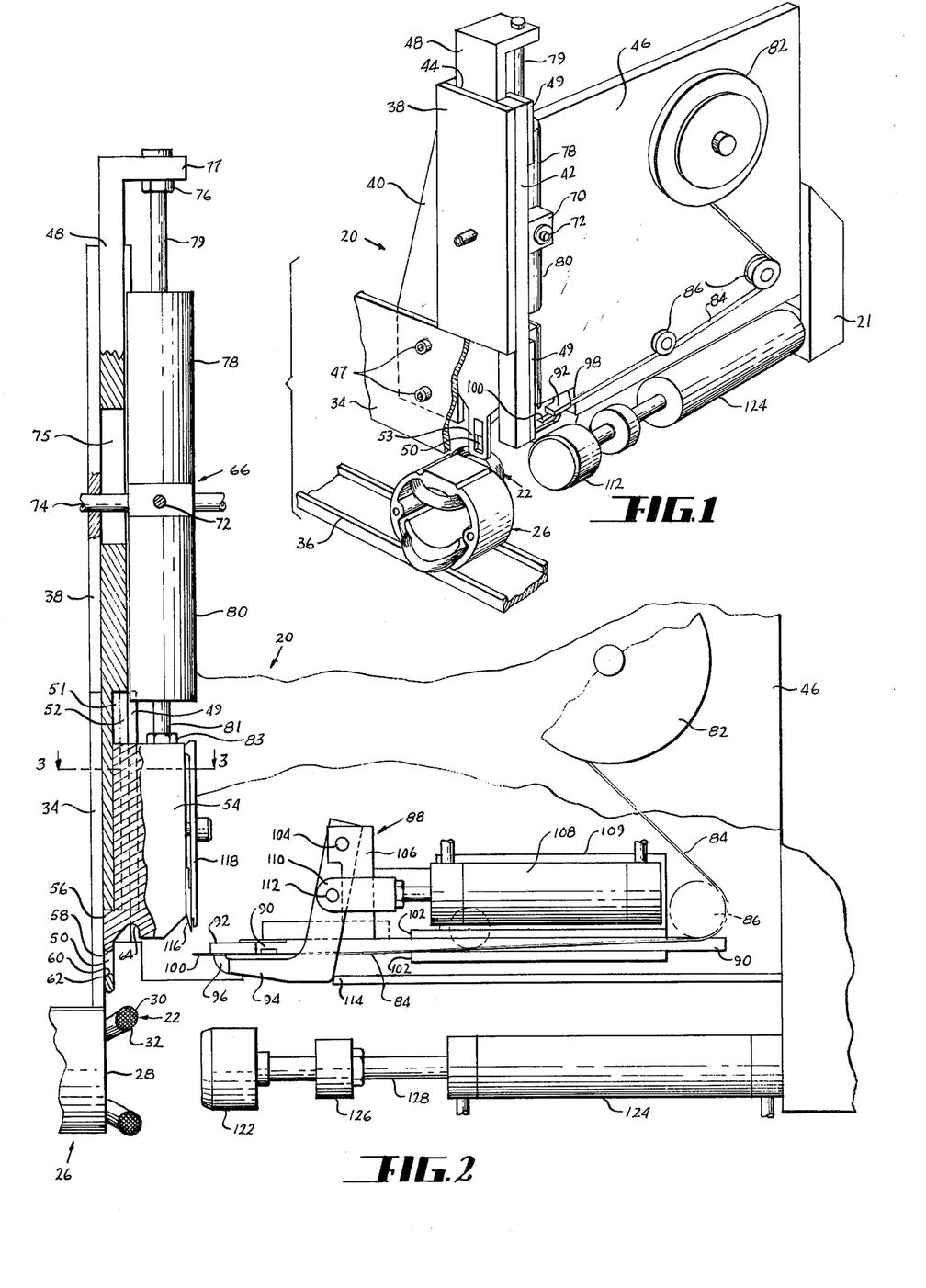
FIG. 1 is a perspective view of a stator coil taping apparatus in accordance with this invention and a stator located with one of its coils positioned to be taped.
FIG. 2 is a side elevational view, partially in section and partially broken away, of the taping apparatus of FIG. 1 prior to the beginning of the taping operation.

Referring to FIG. 1, the reference number 20 designates the taping apparatus of the present invention. Portions of the taping apparatus can be seen to be assembled upon a rear plate 46 which is butt welded to the rear side, as appears in FIG. 1, of a tapered guide plate 40. The plates 40 and 46 which, by reason of welding, comprise a rigid assembly are supported by means of a fixed beam 34 to which the plate 40 is anchored by means of fastener means 47. The assembly is also supported by a bracket member 21 fixedly attached to the right end of the plate 46 as it appears in FIG. 1. By means not shown, the beam 34 and the bracket 21 are fixedly attached to a stator winding mechanism which, being old and well known in the art, is not illustrated in the drawings.

Appearing to the lower front of FIG. 1 is a track 36 onto which stator cores 26 wound by the winding mechanism are discharged, one such stator core 26 having been advanced by a mechanism (not shown) along the track 36 to the position shown in FIG. 1 where the stator core is at rest. A second track, which has been omitted from the drawings for purposes of clarity, is attached to beam 34 so as to be located above the stator core 26 and to generally confront track 36. This second track cooperates with track 36 to confine the stator core 26 and prevent movement thereof during the taping operation.

Welded to the guide plate 40 is a front guide plate 38, and welded to the guide plate 38 in spaced apart relation to the guide plate 40 is a guide bar 42. The guide bar 42, being spaced from the guide plate 40, provides a vertically disposed channel 44 in which an elongate tool member 48 is retained against lateral movement out of the channel 44 by means of plate members 49 which are bolted to the guide plate 40 and to the guide bar 42, as shown in FIG. 3.

With the foregoing preliminary remarks concerning the general support for the taping apparatus 20, attention will now be given to the specific structure of the taping apparatus.

Figures 7, 8, 9, 10, 11:
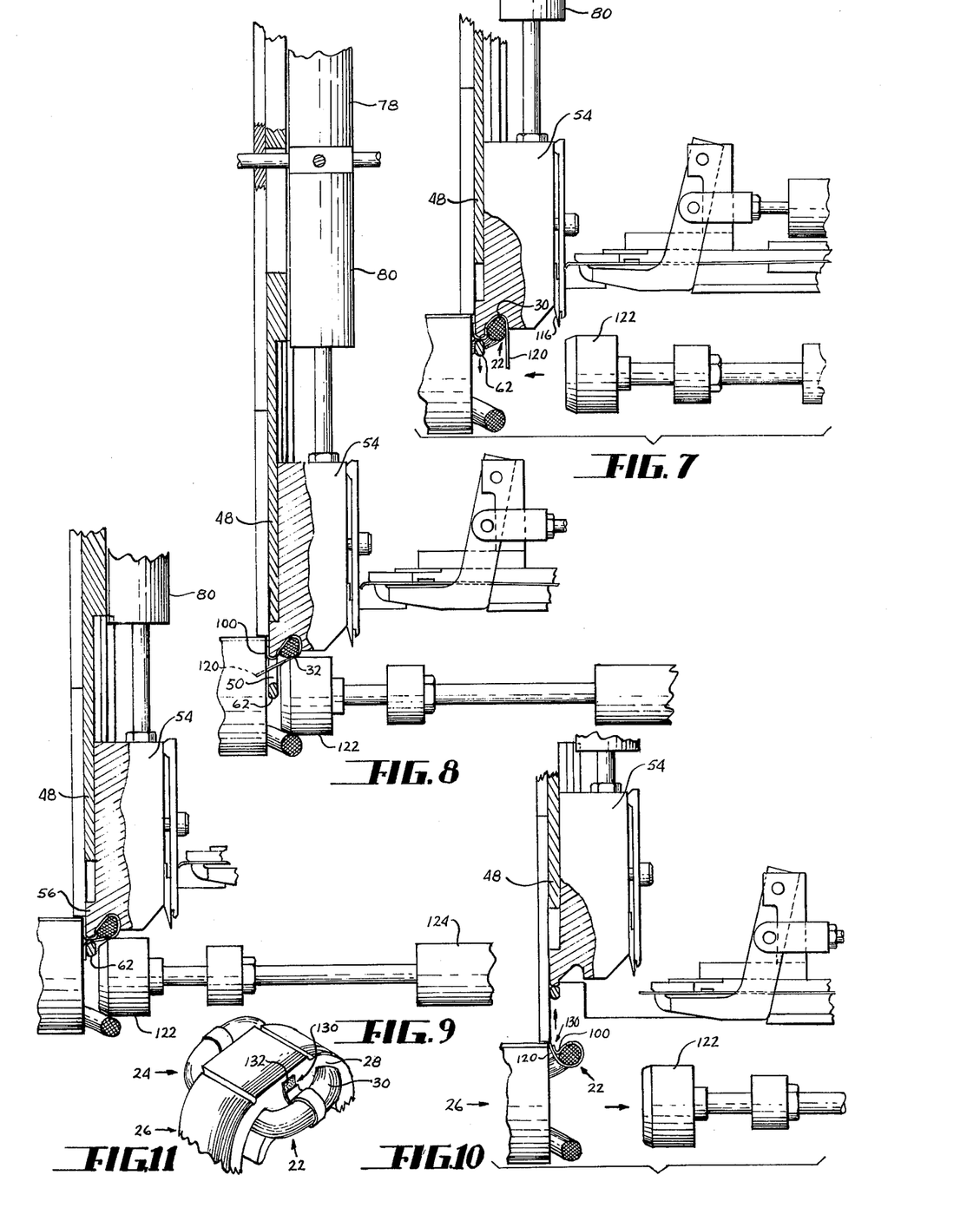
FIG. 11 is a perspective view, partially broken away, of the stator core and coil after the coil end has been taped by the apparatus shown in FIGS. 1 through 10.

The taping apparatus 20 is used to apply tape to an end 22 of a coil 24 mounted on the stator core 26. With reference to FIGS. 2 and 11, the coil end 22 is that portion of the coil 24 that projects from an end face 28 of the stator core 26. Relative to the longitudinal axis of the core 26, the end 22 has a radially outward side 30 and a radially inward side 32.

Figures 3, 4, 5, 6:
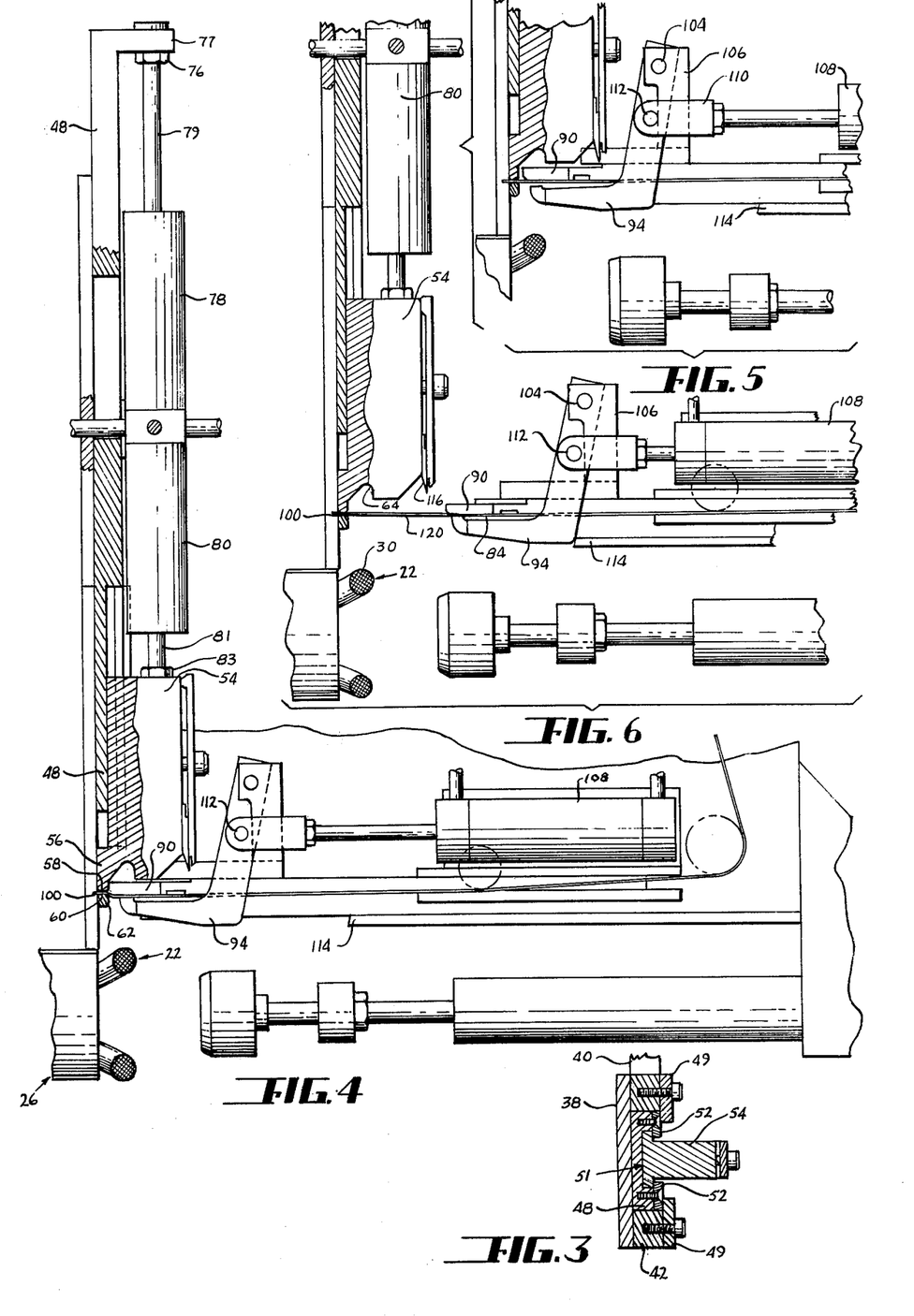
FIG. 3 is a sectional view of a portion of the taping apparatus, taken along the line 3—3 of FIG. 2.
FIGS. 4 through 10 are side elevational views, each showing parts of the apparatus shown in FIG. 1 and illustrating the sequence of operation thereof.

As shown best in FIGS. 2 and 3, and for reasons which will become apparent from the following description, a channel 51 is formed centrally of the rear face of the tool member 48. The lower end of the tool member 48 terminates in a frame portion 53 which is apertured to form a window 50. Guide plates 52 are attached to the tool member 48 along each side of the channel 51. A tape press member 54 is confined by the guide plates 52 in channel 51 for vertical sliding movement relative to the tool member 48.

As apparent in FIG. 3, the tape press member 54 is of generally a T shape so as to interfit the channel 51 and to be retained by the guide plates 52. As appears in FIG. 2, the tape press member 54 has an extension 56 which protrudes into the window 50. The extension 56 has a lowermost clamping surface 58 which, as seen in FIG. 3, confronts a lower clamping surface 60 on a lower margin 62 of the frame portion 53. As best appears in FIG. 2, the tape press member 54 also has a contoured tape press surface 64 disposed adjacent the aforementioned extension 56 and, when the stator 26 is in the position shown in FIG. 2, the surface 64 is located directly above the outward side 30 of the coil end 22. The surface 64 is so contoured as to generally interfit the outward side 30 of the coil end 22 when, as will be described, the tape press member 54 is moved downwardly to engage the coil end 22.

A dual air cylinder 66 is attached by a fastener 72 to a protruding arm 70 affixed to side guide bar 42. Dual air cylinder 66 has an upper air cylinder 78 and a lower air cylinder 80. The upper air cylinder 78 has an actuator rod 79 affixed to a bracket member 77 projecting outwardly from the tool member 48 by means of a nut 76. The lower air cylinder 80 includes an actuator rod 81 which is connected to the tape press member 54 by means of a nut 83.

The air cylinders 78 and 80 and the other air cylinders shown in the drawings are conventional and are operated by compressed air. The air supply valves, hoses and switches which control the operation of the air cylinders are well known and thus are not shown or described in detail.

As apparent in FIG. 2, one of the air hose connections 74 to the dual air cylinder 66 is accommodated by a slot 75 located in the tool member 48. The slot 75 allows the dual acting air cylinder 66 to raise and lower the tool member 48 without destruction to the air hose 74.

It can be noted that the dual air cylinder 66 is fixedly mounted by means of the fastener 72. In general operation, energization of the upper air cylinder 78 vertically moves the tool member 4, and energization of the lower air cylinder 80 vertically moves the tape press member 54. As the tape press member 54 is lowered, the clamping surface 58 of the tape press member 54 is caused to approach the clamping surface 60 of the tool member 48.

A variety of operations can be caused to occur. As one example, the air cylinder 80 may hold the tape press member 54 stationary, and the air cylinder 78 may be actuated to raise the tool member 48, thereby effecting a clamping action between the clamping surface 58 of the tape press member 54 and the clamping surface 60 on the margin 62 of the tool member 48. As a further example, the air cylinder 78 may be actuated to lower the tool member 48 away from the tape press member 54, thus creating an opening through the window 50. As a further possibility, the air cylinder 80 may be actuated at the same time the air cylinder 78 is actuated oppositely, whereupon the two air cylinders are pitted one against the other. By reason of the design of the dual air cylinder 66, the air cylinder 80 is capable of overpowering the air cylinder 78, the consequence being that the air cylinder 80, acting upon the tape press member 54, moves both the tape press member 54 and the tool member 48 downwardly, as appears in FIG. 2, against the upward thrust of the air cylinder 78 on tool member 48. The various operating modes of the dual air cylinder 66 will be more particularly described in ensuing remarks when the operation of the apparatus to wrap the tape about a coil end is described.

The tape source for the apparatus 20 is a tape spool 82 rotatably mounted on rear plate 46. Adhesive tape 84 withdrawn from the spool 82 by a mechanism to be described is guided by tape wheels 86 pivotally mounted to the plate 46 to a tape advancing mechanism 88. In the preferred embodiment, the tape 84 is an adhesive tape, the adhesive side of which faces away from the wheels 86. It should be apparent, however, that other types of tape or binding material can be utilized without deviating from the scope of the present invention.

The tape advancing mechanism 88 includes an air cylinder 108 which is pivotally mounted by means not appearing in the drawing to a plate 109 which is in turn affixed to the rear plate 46. The air cylinder 108 positions a clevis arm 110 to which a lower tape jaw 94 is pivotally secured by a pin 112. The lower tape jaw 94 is pinned by means of pin 104 to a jaw bracket 106 which is affixed to an elongate upper tape jaw 90. The upper tape jaw 90 can be seen to extend horizontally below the air cylinder 108 and between supporting plates 102 which are affixed to the aforementioned plate 109.

The upper tape jaw 90 has a gripping portion 92 projecting forwardly from the plane of FIG. 2 so as to project through a slot 98 extending through the rear plate 46, thus to have access to the tape 84, as shown in FIG. 1. Likewise, the lower tape jaw 94 has a gripping portion 96 which projects forwardly from the plane of FIG. 2 to also enter the slot 98 located in the rear plate 46. The gripping portion 96 of the lower tape jaw 94 does not appear in detail in FIG. 1 because substantially concealed by the gripping portion 92 in slot 98.

The air cylinder 108 is a double acting cylinder and, when urging the clevis 110 to the left as appears in FIG. 2, urges the gripping portion 96 of the lower jaw 94 upwardly toward the gripping portion 92 of the upper jaw 90 so as to grip the leading end 100 of the tape 84 therebetween. Continued operation of the air cylinder 108 to the left as appears in FIG. 2 then functions to advance the leading end of the tape 84 toward the window 50 located in the tool member 48, the distance of such advance being limited as by the stroke length of the cylinder 108. As will be later described more fully, the dual air cylinder is then actuated to cause the tape 84 to be seized and retained between the clamp surfaces 58 and 60. Upon reversal of the direction in which the air cylinder 108 moves the clevis 110, the first action to occur will be a downward swing of the lower jaw 94 about the axis of the pin 104 to release the tape 84. Continued movement of the clevis 110 to the right as appears in FIG. 2 will cause the pin 112 to drivingly engage the jaw bracket 106, thus advancing both the lower jaw 94 and the upper jaw 90 to the right as shown in FIG. 2, the movement of such jaws being guided by the supporting plates 102 which receive the upper jaw 90 therebetween. As the jaws 90 and 94 move to the right as appears in FIG. 2, the jaw 94 ultimately bumps against an abutment 114 which is fixedly attached to the rear plate 46. At the time the jaw 94 bumps against the abutment 114, the rightward motion of the clevis 110 is being continued by the air cylinder 108 and the continued motion of the clevis 110 causes the lower jaw 94 to rise upwardly, pivoting about the pin 104, with the result that the jaws 90 and 94 again seize the tape 84. As previously indicated, the leading end 100 of the tape 84 is restrained during the rightward movement of the clevis 110; and, accordingly, the jaws 90 and 94 slip with respect to the tape 84 during the rightward movement of the clevis 110. After the lower jaw 94 has engaged the abutment 114 and continued motion of the clevis 110 to the right has caused the lower jaw 94 to swing upwardly as described, the available rightward movement of the cylinder 108 is stalled, and the tape is thereby clamped between the jaws 90 and 94 by maintaining the force of cylinder 108 in the rightward direction.

For reasons to be more fully described in a later portion of this specification, a vertical tape knife 116 is attached to the tape press member 54 by a knife bracket 118. This knife, which moves with the press member 54, will be utilized to sever the tape 84 at an appropriate point in the operating cycle hereinafter described. There is also shown in the drawings, particularly FIGS. 1 and 2, an air cylinder 124 which is mounted to aforementioned bracket 21. The air cylinder 124 has an actuator rod 128 joined by a collar 126 to a tape ram 122. As will be more fully discussed in the operating cycle described below, the tape ram 122 is moved at appropriate times by operation of the air cylinder 124 for the purposes of advancing tape being wrapped about a coil end to desired positions.

In a preferred operating cycle, the initial position of the apparatus 20 is as shown in FIG. 2. The upper tape jaw 90 and lower tape jaw 94 are in their most rightward positions gripping the tape 84 at its then leading end 100. The adhesive side of the tape 84 is the side facing gripping portion 96. The stator core 26 is supported by the track 36 so that the coil end 22 is in a position ready for taping. Both the tool member 48 and the tape press member 54 are withdrawn away from the coil end 22 with the lower margin 62, lower extension 56, and their clamping surfaces 58 and 60 spaced apart to expose the window 50. The tape ram 122 is also withdrawn away from the stator core 26.

The jaws 90 and 94 are then advanced toward window 50 by the action of air cylinder 108 on lower jaw 94, with the jaws remaining in a closed and gripping position by the pivoting action of lower jaw 94 about the pin 104. The leading end 100 of the tape 84 is thereby inserted through the exposed window 50. The tool member 48 is then raised by actuation of air cylinder 78, causing the tape end to be clamped at window 50 between the clamping surface 58 on the lower extension 56 of the tape press member 54, and the clamping surface 60 on the lower margin 62 as shown in FIG. 4.

After the leading end 100 is clamped at the window 50, the lower jaw 94 pivots away from upper jaw 90 to release the tape, as shown in FIG. 5. The pivoting of the lower jaw 94 away from jaw 90 is accomplished by reversing air cylinder 108 to move the tape jaws 90 and 94 back to their rightward position. Air cylinder 108 causes clevis arm 110 to pull the lower jaw 94 pivotally about the pin 104 and thereby separate the lower jaw 94 from the upper jaw 90. The separation of the lower jaw 94 from the upper jaw 90 is only slight, however, since the pin 112 will strike the bracket 106 shortly after the pivoting action of the jaw 94 begins, as is shown in FIG. 5. The continued action of the pin 112 against the bracket 106 will then cause both upper jaw 90 and lower jaw 94 to move rightwardly toward their original positions.

As shown in FIG. 6, the lower and upper jaws will again grip the tape as they move rightwardly to their original positions. When lower jaw 94 strikes the abutment 114, its rightward movement is stopped, and the continued rightward action of air cylinder 108 causes the lower jaw 94 to pivot about pin 104 until the jaws 90 and 94 come to rest, clamping the tape 84.

The lower cylinder 80 is then actuated to move the tape press member 54 down against the corresponding surface portion of the radially outward side 30 of coil end 22 so that the contoured surface 64 of press member 54 presses the adhesive side of a section of the tape adjacent the leading end 100 against the coil end 22, as shown in FIG. 7. As the tape press member 54 moves down, the tape knife 116 severs the tape 84 at a trailing end portion 120 so that a predetermined length of tape is used to wrap the coil end 22. The downward movement of tape press member 54 will bend trailing end portion 120 into the path of tape ram 122. During this downward movement, air cylinder 80 and air cylinder 78 are acting against each other, the clamping surface 60 on lower margin 62 being urged by air cylinder 78 upward and against the clamping surface 58 on the lower extension 56, which is being pushed downward by air cylinder 80. In the preferred embodiment, air cylinders 78 and 80 have been so chosen that the force exerted by cylinder 80 will be greater than that exerted by cylinder 78. Thus, the downward force of air cylinder 80 is sufficient to overcome the upward force of air cylinder 78, resulting in the movement of both the tool member 48 and tape press member 54 downward. However, the action of air cylinder 78, even though overpowered by air cylinder 80, keeps the tool member 48 biased upward so that the tape 84 continues to be clamped at window 50 between the clamping surface 58 on lower extension 56 and the clamping surface 60 on the lower margin 62 of tool member 48.

After the tape is pressed against the coil end 22 by the surface 64, air cylinder 78 is reversely actuated in order to reverse the direction of force on tool member 48 so that clamping surface 60 on margin 62 moves down and away from clamping surface 58 on lower extension 56. Window 50 is again exposed for receiving tape, but this time adjacent the radially inward side 32 of the coil end 22. Tape ram 122 is then moved axially by air cylinder 124 toward the opened window 50, pushing the trailing end 120 around the inward side 32 of coil end 22 and through the window 50 as shown in FIG. 8. The tool member 48 is then moved upward by air cylinder 78, clamping the leading and trailing ends of the tape together between the clamping surfaces 58 and 60 on lower extension 56 and lower margin 62 as shown in FIG. 9. The tool member 48 and tape press member 54 are then both withdrawn upwardly from the stator core by air cylinders 78 and 80, drawing trailing end 120 tightly around the coil and leaving a tab 130 formed by the two tape ends extending upwardly between the coil end 22 and core 26 as shown in FIG. 10. The ram 122 is withdrawn by reversing air cylinder 124, the stator core 26 is removed, the tool member 48 and tape press member 54 are moved apart to expose the window 50, and the apparatus is again in the initial position shown in FIG. 2, ready to perform the taping operation on a new coil end.

As can be seen most clearly in FIGS. 10 and 11, the tab 130 is formed by the taping apparatus with trailing end 120 overlapping leading end 100 so that the adhesive side 132 of the tab faces the coil end and can be manually pressed against it. This arrangement has been found to be particularly helpful in the manufacture of stators. Frequently there are finish wires leading from the stator coil which need to be readily available for later electrical connections but which often interfere with other work operations to be performed on the stator if they are left dangling from the coil. If such is the case, the finish wires may be conveniently held in place against the coil end by bringing them around the coil end to a position adjacent the tab 130, and then pressing the tab 130 to the coil end and over the finish wires.

It should be noted that, although the adhesive side 132 of the tab is shown in FIG. 11 generally facing the coil end, it can, if desired, be alternately made to face the core so that the tab may be pressed against the core rather than the coil end. This reversal is accomplished by making the leading end 100 longer than the trailing end 120. The relative length of the leading and trailing ends and the overall length of the tab 130 is easily varied during the operation of the apparatus by either controlling the movement of the advancing mechanism 88 so that more or less tape is fed through the exposed window 50 at the beginning of the taping operation, and in so doing affecting the length of the leading end 100, or by changing the mounting of the knife 116, by spacers or the like (not shown), so that it cuts the tape closer to or farther from the window 50, and in so doing affecting the length of the trailing end 120.

In a second embodiment shown in FIGS. 12 through 17, the construction and operation of the taping apparatus may be modified so that no tab will be formed. For purposes of comparison, the letter "a" has been added to the reference numerals of the second embodiment, but otherwise the parts of the second embodiment have been designated with generally the same reference numbers as the corresponding parts of the first embodiment.

Figure 12:
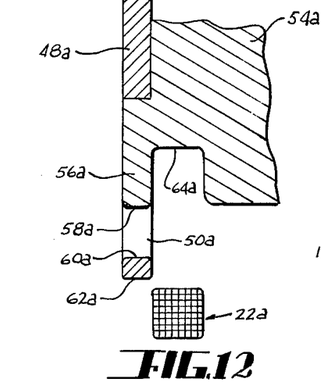
FIG. 12 is a sectional view of a portion of a modified taping apparatus in accordance with this invention.

FIG. 12 shows the initial position of an elongate tool member 48a, a tape press member 54a, and a coil end 22a. The tool member 48a and the tape press member 54a are controlled by a dual air cylinder (not shown) corresponding to the air cylinder 66 of the preferred embodiment. The upper air cylinder of the dual air cylinder vertically moves the tool member 48a, and the lower air cylinder of the dual air cylinder vertically moves the tape press member 54a.

For purposes of illustrating the application of the present invention to coils of various shapes, the coil end 22a is illustrated as having a generally square shape with a surface 64a correspondingly contoured. A square-shaped coil is generally indicative of a free standing coil, i.e., a coil which is wound first and later inserted into a stator core. The actual shape of the coil end, however, is generally unimportant in the practice of either the first or second embodiments, and the present invention may be used in taping either a coil wound on a stator core or a coil wound and later inserted into a stator core. In a coil of the latter type, the taping in accordance with the present invention may be accomplished either prior to or after insertion of the coil into the stator core.

Figures 13, 14:
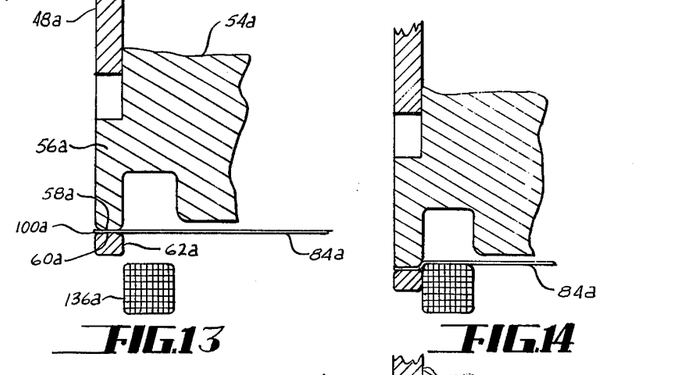
FIGS. 13 through 17 are sectional views, each showing the portion of the modified apparatus of FIG. 12 and illustrating the sequence of operation thereof.

A leading end 100a of adhesive tape 84a is moved by a tape advancing mechanism (not shown) and inserted through a window 50a in tool member 48a. The previously mentioned upper air cylinder is actuated to raise tool member 48a and thereby clamp the leading end 100a between a lower margin 62a on tool member 48a and a lower extension 56a on tape press member 54a, at their clamping surfaces 58a and 60a. As shown in FIG. 13, the tool member 48a and tape press member 54a are moved down toward the coil end 22a. This downward movement is accomplished by the downward action on the lower air cylinder on tape press member 54a. As in the preferred embodiment, the tape remains clamped during the downward movement by biasing tool member 48a upwardly with the upper air cylinder.

When contact between the coil end and tape 84a is made, as illustrated in FIG. 14, the upper air cylinder is reversed so that the margin 62a on tool member 48a is moved away from the lower extension 56a on tape press member 54a. This single step is required to prevent the tape 84a from tearing, which would occur if the tool member 48a and the tape press member 54a continued their downward movement with the tape clamped therebetween.

Figure 15:
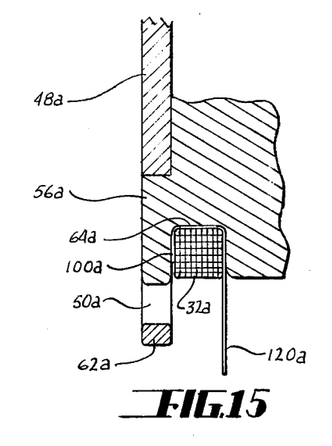
Figure 16:
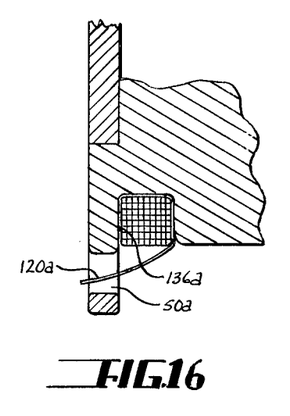
Figure 17:
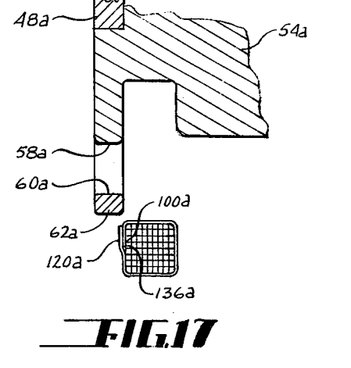

Thereafter, the tool member 48a and the tape press member 54a continue their spaced apart and downward movement until they reach a position, shown in FIG. 15, at which the window 50a is exposed on the inward side 32a of the coil end, and the contoured surface 64a is in contact with the coil end so that a portion of the tape, including a leading end 100a, is pressed to the coil end, and a trailing end 120a is bent into the path of a tape ram. As illustrated in FIG. 16, the tape ram (not shown) then pushes the trailing end 120a of the tape through the window 50a. The tape press member 54a and tool member 48a are then moved upwardly by the dual air cylinder, with the clamping surfaces 58a and 60a remaining apart so that the lower margin 62a wraps the trailing end 120a of the tape around a back side 136a of the coil end, illustrated at the left side of the coil end in FIG. 17, over the leading end 100a of the tape.

Although the presently preferred embodiments of this invention have been described, it will be noted that within the purview of this invention various changes may be made within the scope of the appended claims.

Having thus described my invention, I claim:

1. In an apparatus for wrapping tape about an article:
   a tool member having an aperture;
   a first clamping member comprising marginal portions of said aperture;
   a tape press member slidably mounted on said tool member;
   a second clamping member extended from said tape press member into said aperture;
   means for moving said tool member and said tape press member to receive between said first and second clamping members a leading end portion of the tape from a direction extended along a first side of the article, to receive between said first and second clamping members a trailing end portion of the tape from a direction extended along a second side of the article, said second side being generally oppositely directed from said first side, and to press said leading end portion and said trailing end portion together.

2. The apparatus of claim 1 wherein said tape press member has thereon a contoured surface corresponding to a surface portion of the article, and wherein said contoured surface on said tape press member is operable to press a section of the tape adjacent said leading end portion to said surface portion of the article.

3. The apparatus of claim 2 further including tape feed means, said tape feed means comprising a tape source, tape advancing means for gripping said leading end portion of the tape from said tape source and advancing said leading end portion along said first direction to a position between said first and second clamping members, and tape cutting means mounted on said tape press means for cutting the tape at said trailing end portion.

4. The apparatus of claim 3 further including tape engaging means for engaging said trailing end portion and moving said trailing end portion to a position between said first and second clamping members.

5. In an apparatus for wrapping tape about an article:
   means for feeding a strip of the tape having a leading end portion and a trailing end portion to a predetermined initial position relative to the article;
   first and second clamping members movable relative to the article and to each other from a position at which said leading end portion is received between said first and second clamping members from a direction along a first side of the article, to a position at which said trailing end portion is received between said first and second clamping members from a direction along a generally oppositely directed second side of the article;
   tape press means for pressing a section of said strip adjacent said leading end portion to the article and in so doing partially wrapping said strip and bending said trailing end portion about the article;
   tape engaging means for engaging and further bending said trailing end portion about the article to where said trailing end portion is received between said first and second clamping members; and
   means for moving said first and second clamping members from said first mentioned position of said clamping members to said second mentioned position of said clamping members and back to said first mentioned position, said clamping members being located sufficiently near the article so that as said first and second clamping members move from said second mentioned position back to said first mentioned position, said trailing end portion is drawn tightly and pressed to said leading end portion so that the article is wrapped.

6. In an apparatus for wrapping tape about an article:
   first and second clamping members, one of said clamping members being an extension of a tape press member, said tape press member having a tape press portion extending adjacent said extension; and
   means for moving said clamping members from a first position at which said clamping members are spaced apart for receiving a leading end portion of the tape therebetween, to a second position at which said leading end portion is clamped between said clamping members to a third position at which said tape press portion presses a section of the tape adjacent said leading end portion to a surface portion of the article.

7. The apparatus of claim 6 wherein said first clampling member is a margin of a frame portion bounding an aperture in a thin tool member, wherein said second clamping member is said extension of said tape press member, said extension partially occupying said aperture and said tape press member slidably mounted on said tool member, and wherein said tape press portion includes a contoured surface corresponding to said surface portion of the article.

8. In an apparatus for wrapping tape about an end of a coil mounted on a stator core:
   means for feeding a strip of the tape having a leading end portion and a trailing end portion into a position at which a section of the tape adjacent said leading end portion confronts a surface portion of a radially outward side of the coil end;
   a tool member having an aperture and being sufficiently thin for movement between the coil end and the stator core, the stator core having a central longitudinal axis and the movement of the tool member being generally radial relative to said longitudinal axis;
   a tape press member slidably mounted on said tool member, said tape press member having an extension contained within said aperture for movement therein, said tape press member further including a contoured surface corresponding to and confronting said surface portion of said radially outward side of the coil end, said tool member and said tape press member being movable relative to the coil end and to each other from a first position wherein an inward margin of said aperture and said extension are spaced apart to receive therebetween said leading end portion from a direction along said outward side of the coil end, to a second position wherein said inward margin and said extension are brought together, to a third position wherein said contoured surface is pressed against said outward side of the coil end, to a fourth position wherein said inward margin is spaced apart from said extension to receive therebetween said trailing end portion from a direction along a radially inward side of the coil end, then back to said first position;
   tape cutting means affixed to said tape press member for cutting the tape at said trailing end portion, said trailing end portion being at a predetermined distance from said leading end portion;

a tape ram movable on a path along said longitudinal axis of the stator core from a point away from the stator core to a point near said tool member;

means for moving said tape ram along said path to thereby move said trailing end portion along said inward side of the coil end;

means for moving said tool member and said tape press member from said first position to said second position to clamp said leading end, to said third position to press said section of the tape against said surface portion and in so doing partially wrap the tape and partially bend said trailing end portion around the coil end and into said path of said tape ram, to a fourth position so that said trailing end portion may be received between said inward margin and said extension after said trailing end portion has been moved along said inward side of the coil end by said tape ram, then back to said first position so that said trailing end portion is drawn tightly and pressed by said tool member against the coil end and to said leading end portion so that the coil end is wrapped.

9. The apparatus of claim 8 wherein said tool member and said tape press member are movable to a fifth position from said fourth position whereat said leading and trailing end portions are clamped between said margin and said extension and adjacent the coil end to thereby form a tab projecting from the coil end, wherein said means for moving said tool member and said tape press member includes means for moving said tool member and said tape press member to said fifth position, and wherein one of said leading end portion and said trailing end portion is longer than the other of said leading end portion and said trailing end portion.

10. The apparatus of claim 8 wherein said tape press member further includes means for pressing said leading end portion to the coil end so that upon movement of said tool member and said tape press member from said fourth position back to said first position, said inward margin at said aperture presses said trailing end portion against the coil end and over said leading end portion.

11. In a method for wrapping tape about an article utilizing a taping apparatus having two clamping members and a tape ram:

advancing a leading end portion of the tape along one side of the article to a position between the clamping members;

moving the tape ram to engage a trailing end portion of the tape and to advance said trailing end portion along a second generally oppositely directed side of the article to a position between the clamping members; and moving the clamping members to press together said leading end portion and said trailing end portion.

12. The method of claim 11, further comprising pressing a section of the tape adjacent said leading end portion to the article, to partially wrap the tape about the article and bend said trailing end portion into the path of the tape ram.

13. In an apparatus for wrapping tape about an article:

first and second clamping members mounted and confined for movement in a path along one side of the article and occupying a first position wherein said second clamping member is spaced from said first clamping member;

means for extending the leading end of the tape along a path adjacent the article and toward said path of movement of said clamping members to a position wherein the leading end of the tape is between said first and second clamping members when in said first position;

means for wrapping the tape partially around said article while the leading end of the tape is located between said clamping members and extending the trailing end of the tape into the path of movement of said clamping members;

and means for moving said clamping members both together and relative to one another to receive the trailing end portion of the tape therebetween and to engage said trailing end portion by one of said clamping members to move it toward the leading end portion of the tape so that the tape is wrapped further around the article.

14. The apparatus of claim 13 wherein said means for moving said clamping members moves said last mentioned one of said clamping members after engagement thereof with the trailing end portion of the tape by a distance sufficient to cause said leading and trailing end portions of the tape to be pressed together.

15. The apparatus of claim 14 wherein said means for moving said clamping members moves said clamping members along said path of movement thereof after the leading and trailing end portions of the tape are pressed together sufficiently to become disengaged from the leading and trailing end portions of the tape.

16. The apparatus of claim 13 wherein said means for moving said clamping members moves said last mentioned clamping member through a distance sufficient to cause the trailing end portion of the tape to be wrapped over the leading end portion of the tape.

17. In an apparatus for wrapping tape about outside surfaces of an article:

an elongate tool member having a margin defining a window therethrough;

actuator means for moving said tool member in the direction of its length to respectively position said window adjacent the upper and lower extremities of said article;

tape feed means for feeding a leading end of said tape from a source of tape over said article and into said window at one of said extremities; and ram means for pushing a trailing end of said tape under said article and into said window at the opposite of said extremities, movement of said tool member from said upper extremity toward said lower extremity wrapping a leading portion of said tape about a portion of said article and return movement of said tool member from said lower extremity to said upper extremity wrapping the trailing end of said tape about another surface of said article toward lapping relation with said leading end.

18. The apparatus of claim 17 including a second tool member having a protrusion extending into said window and second actuator means for moving said second tool member relative to said first tool member in the direction of the length of said first tool member between limits defined by said margin, said second tool member movable by operation of said second actuator means for clamping tape received in said window against a margin of said window.

19. In an apparatus for wrapping tape about outside surfaces of an article:

a first tool member having a portion protruding from one face thereof;

a second tool member slidably mounted on the face of said first tool member and having a margin defining an opening receiving said protruding portion, said margin limiting sliding movements of said second tool member relative to said first tool member by engagement with said protruding portion;

tool positioning means comprising first actuator means for moving said first tool member linearly alongside the article to be wrapped, and second actuator means for moving said second tool member with respect to said first tool member between the limits imposed by said margin to cause said protruding portion at one of said limits to provide an open space in said opening for the receipt of tape to be wrapped and to clamp said tape by closing said space at another of said limits so that linear movements of said first tool member and movements of said second tool member with respect to said first tool member may be employed to create a space in said opening for the receipt of tape and to clamp tape located within said space at different positions alongside said article.

20. In an apparatus for wrapping tape about outside surfaces of an article:

a first tool member having a margin defining an opening in said member;

a second tool member slidably mounted on said first tool member and having a portion protruding into said opening whereby said margin cooperates with said protruding portion to limit sliding movement of said second tool member relative to said first tool member;

tool positioning means comprising first actuator means for moving said second tool member linearly between upper and lower positions with respect to the article to be wrapped and second actuator means for moving said first tool member with respect to said second tool member between the limits imposed by said margin in at least one of said first and second positions so that tape inserted in said opening in one of said first and second positions may be clamped against said protruding portion by movement of said first tool member.

* * * * *

UNITED STATES PATENT AND TRADEMARK OFFICE
CERTIFICATE OF CORRECTION

PATENT NO. : 4,086,117

DATED : April 25, 1978

INVENTOR(S) : Harold I. Pearsall

It is certified that error appears in the above–identified patent and that said Letters Patent are hereby corrected as shown below:

Col. 4, line 6, "4" should be ---48---.

Signed and Sealed this

Sixteenth Day of January 1979

[SEAL]

Attest:

RUTH C. MASON
Attesting Officer

DONALD W. BANNER
Commissioner of Patents and Trademarks